(12) United States Patent
Yamamoto et al.

(10) Patent No.: US 11,362,859 B2
(45) Date of Patent: Jun. 14, 2022

(54) IN-VEHICLE COMMUNICATION DEVICE AND IN-VEHICLE SYSTEM

(71) Applicant: HITACHI AUTOMOTIVE SYSTEMS, LTD., Hitachinaka (JP)

(72) Inventors: Naoyuki Yamamoto, Hitachinaka (JP); Hiroki Yamazaki, Hitachinaka (JP); Hitoshi Kawaguchi, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 0 days.

(21) Appl. No.: 17/268,815

(22) PCT Filed: Jul. 26, 2019

(86) PCT No.: PCT/JP2019/029370
§ 371 (c)(1),
(2) Date: Feb. 16, 2021

(87) PCT Pub. No.: WO2020/039844
PCT Pub. Date: Feb. 27, 2020

(65) Prior Publication Data
US 2021/0176090 A1 Jun. 10, 2021

(30) Foreign Application Priority Data
Aug. 24, 2018 (JP) .............................. JP2018-157029

(51) Int. Cl.
*H04L 12/40* (2006.01)
*H04W 4/46* (2018.01)

(52) U.S. Cl.
CPC .. *H04L 12/40182* (2013.01); *H04L 12/40189* (2013.01); *H04W 4/46* (2018.02);
(Continued)

(58) Field of Classification Search
CPC ......... H04L 12/40182; H04L 12/40189; H04L 2012/40273; H04L 2012/40215; H04W 4/46
See application file for complete search history.

(56) References Cited

U.S. PATENT DOCUMENTS 7,392,424 B2 * 6/2008 Ho ........................ H04L 45/04
714/4.4
7,801,162 B2 * 9/2010 Jeon ....................... H04L 12/66
370/402
(Continued)

FOREIGN PATENT DOCUMENTS

JP 2015-156565 A 8/2015
JP 2016-134717 A 7/2016
(Continued)

OTHER PUBLICATIONS

International Search Report with English translation and Written Opinion issued in corresponding application No. PCT/JP2019/029370 dated Oct. 15, 2019.

*Primary Examiner* — Rasheed Gidado
(74) *Attorney, Agent, or Firm* — Foley & Lardner LLP

(57) ABSTRACT

The present invention provides an in-vehicle communication device and an in-vehicle system that can establish communication, in a short time, between applications corresponding to the same communication protocol between in-vehicle processing devices connected to communication buses having different communication protocols. In the present invention, when the first communication controller 33 has received a specific message from the first in-vehicle processing device 102 connected to the first communication bus 101, the in-vehicle communication device 1 transmits a communication protocol switching command from the second communication controller 3 to the second in-vehicle processing device 202 connected to the second communi-
(Continued)

cation bus 201 to switch a communication protocol setting of the second communication controller to the same communication protocol setting as that of the first communication bus.

2 Claims, 5 Drawing Sheets

(52) U.S. Cl.
CPC ............... *H04L 2012/40215* (2013.01); *H04L 2012/40273* (2013.01)

(56) References Cited

U.S. PATENT DOCUMENTS

| | | | | |
|---|---|---|---|---|
| 8,819,327 | B2* | 8/2014 | Hartwich | G06F 13/4027 710/315 |
| 2013/0166778 | A1* | 6/2013 | Ishigooka | H04L 67/12 709/248 |
| 2015/0237104 | A1 | 8/2015 | Oguchi | |
| 2017/0072876 | A1* | 3/2017 | Rajan | H04L 69/08 |
| 2018/0013569 | A1* | 1/2018 | Knopf | H04L 9/088 |
| 2018/0097887 | A1* | 4/2018 | Koshimae | H04L 12/40013 |
| 2018/0189483 | A1* | 7/2018 | Litichever | H04L 29/00 |

FOREIGN PATENT DOCUMENTS

| | | | |
|---|---|---|---|
| JP | 2017-135627 | A | 8/2017 |
| JP | 2017-188793 | A | 10/2017 |
| JP | 2017-188794 | A | 10/2017 |

\* cited by examiner

| COMMUNICATION BUS No | CONNECTION DEVICE | COMMUNICATION PROTOCOL |
|---|---|---|
| 1 | ECU1 | CAN |
| 2 | ECU2, ECU3, ⋯ | CAN-FD |
| ⋯ | ⋯ | ⋯ |
| N | ECU-N, ⋯ | CAN |

IN-VEHICLE COMMUNICATION DEVICE AND IN-VEHICLE SYSTEM

TECHNICAL FIELD

The present invention relates to an in-vehicle communication device and an in-vehicle system.

BACKGROUND ART

Currently, a plurality of electronic control units (hereinafter, ECUs: Electronic Control Units) are installed in a vehicle, and each ECU is connected by a controller area network (CAN) bus and communicates with each other.

Recent in-vehicle network requirements (RFQ) include CAN with Flexible Data Rate (CAN-FD) in addition to CAN. Since data structures of a CAN data frame and a CAN-FD data frame are different (incompatible), an ECU connected to a CAN network cannot communicate directly with an ECU connected to a CAN-FD network. Therefore, an ECU connected to the CAN network communicates with an ECU connected to the CAN-FD network via a gateway. The gateway, when performing a relay between the CAN network and the CAN-FD network, converts a CAN data frame into a CAN-FD data frame and converts a CAN-FD data frame into a CAN data frame.

Here, when a communication protocol of the conventional CAN network is changed to CAN-FD, it becomes necessary to recreate the existing CAN data frame compatible application to a CAN-FD data frame compatible application, and man-hours for developing the application increase. Therefore, by temporarily switching the communication protocol of the CAN-FD network to CAN, it is conceivable to enable the operation of the existing CAN data frame compatible application in the ECU connected to the CAN-FD network. For example, Patent Literature 1 is a prior art document that discloses a communication method for switching a network communication protocol.

Patent Literature 1 discloses a communication method, which is executed by a gateway for relaying a relay message received from a first electronic control device to a second electronic control device in a communication system including the first electronic control device that is connected to a first communication bus and performs message communication based on a predetermined communication protocol, the second electronic control device that has a function capable of using a plurality of communication protocols by switching them, is connected to a second communication bus, and performs message communication based on any one of the plurality of communication protocols, and the gateway connected to the first communication bus and the second communication bus, the communication method including the steps of determining whether or not a communication protocol of the relay message and a communication protocol used in the second communication bus match, sending the relay message to the second communication bus as it is when the communication protocol of the relay message and the communication protocol used in the second communication bus match, requesting all of the second electronic control devices to change the communication protocol used in the second communication bus to the communication protocol of the relay message when the communication protocol of the relay message and the communication protocol used in the second communication bus do not match, sending the relay message to the second communication bus as it is when change permission responses corresponding to the request can be received from all of the second electronic control devices before a predetermined time elapses, and converting the communication protocol of the relay message into the communication protocol used in the second communication bus, and sending the converted relay message to the second communication bus when the change permission responses corresponding to the request cannot be received from all of the second electronic control devices before the predetermined time elapses.

CITATION LIST

Patent Literature

PTL 1: JP 2017-135627 A

SUMMARY OF INVENTION

Technical Problem

According to the communication method disclosed in Patent Literature 1, it is considered that the communication protocol (CAN-FD) of the second communication bus is switched to the communication protocol (CAN) of the first communication bus, and thereby it becomes possible to operate the application corresponding to the communication protocol (CAN) of the first communication bus in the electronic control device connected to the second communication bus.

However, with this communication method, after the gateway sends a communication protocol change request to all the electronic control devices connected to the second communication bus, the gateway needs to receive the change permission responses from all these electronic control devices. Therefore, it takes time to switch the communication protocol of the second communication bus.

The present invention has been made in view of the above problems and has an object to provide an in-vehicle communication device and an in-vehicle system that can establish communication, in a short time, between applications corresponding to the same communication protocol between in-vehicle processing devices connected to communication buses having different communication protocols.

Solution to Problem

In order to achieve the above object, the present invention is an in-vehicle communication device that is connected to a first communication bus and a second communication bus and relays data between the first communication bus and the second communication bus, the in-vehicle communication device including: a first communication controller connected to the first communication bus; and a second communication controller connected to the second communication bus, in which when the first communication controller has received a specific message from a first in-vehicle processing device connected to the first communication bus in a state where a communication protocol of the first communication bus and a communication protocol of the second communication bus are different, the in-vehicle communication device transmits a communication protocol switching command from the second communication controller to a second in-vehicle processing device connected to the second communication bus to switch a communication protocol setting of the second communication controller to a same communication protocol setting as that of the first communication bus.

According to the present invention configured as described above, when the communication protocols of the first communication bus and the second communication bus are different, the communication protocol of the second communication bus is switched to the same communication protocol as that of the first communication bus, and thereby it becomes possible to operate a diagnostic application and a repro application corresponding to the communication protocol of the first communication bus in the second in-vehicle processing device. This eliminates the need to change the diagnostic application or repro application corresponding to the communication protocol of the first communication bus for the communication protocol of the second communication bus.

Therefore, in an in-vehicle system in which different communication protocols coexist, it is possible to suppress the development cost of the diagnostic application and repro application.

Also, when the communication protocol of the second communication bus is switched, only the second communication controller of the in-vehicle communication device and the communication controller of the second in-vehicle processing device are reset, so the communication protocol of the second communication bus can be switched in a short time.

Advantageous Effects of Invention

According to the present invention, it is possible to establish communication between applications corresponding to the same communication protocol in a short time between in-vehicle processing devices connected to communication buses having different communication protocols.

DESCRIPTION OF EMBODIMENTS

Figures 1, 2:
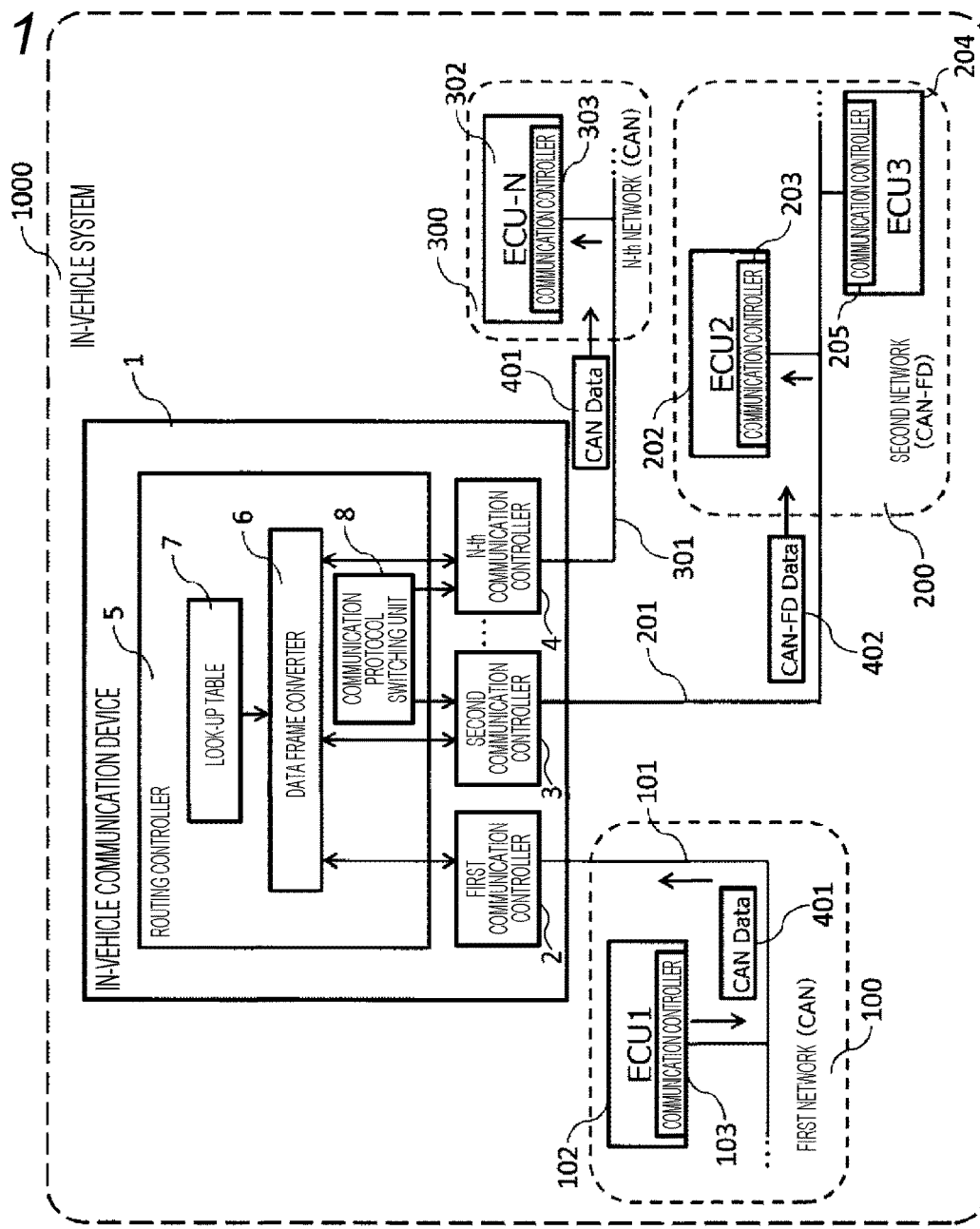
FIG. 1 is a schematic configuration diagram of an in-vehicle communication device and an in-vehicle system according to an embodiment of the present invention.
FIG. 2 is a diagram showing an example of a look-up table set in the in-vehicle communication device shown in FIG. 1.

Hereinafter, examples of the present invention will be described with reference to the drawings. In each drawing, members or elements having the same action or function are designated by the same reference numerals, and duplicate description will be omitted as appropriate.

FIG. 1 is a schematic configuration diagram of an in-vehicle communication device and an in-vehicle system according to an embodiment of the present invention.

In FIG. 1, an in-vehicle system 1000 includes a plurality of networks (first network 100, second network 200, . . . N-th network 300) and an in-vehicle communication device 1 that relays data between the plurality of networks 100, 200, . . . 300.

The first network 100 includes a first communication bus 101 and one or more in-vehicle processing devices 102 (denoted as "ECU1" in the figure) connected to the first communication bus 101. The communication protocol of the first network 100 is, for example, CAN.

The second network 200 includes a second communication bus 201 and one or more in-vehicle processing devices 202, 203 (denoted as "ECU1" and "ECU2" in the figure) connected to the second communication bus 201. The communication protocol of the second network 200 is, for example, CAN-FD.

The N-th network 300 includes an N-th communication bus 301 and one or more in-vehicle processing devices 302 (denoted as "ECU-N" in the figure) connected to the N-th communication bus 301. The communication protocol of the N-th network 300 is set to CAN, for example.

The in-vehicle communication device 1 includes a first communication controller 2 connected to the first communication bus 101, a second communication controller 3 connected to the second communication bus 201, an N-th communication controller 4 connected to the N-th communication bus 301, and a routing controller 5 that relays data between the first to N-th communication controllers 2 to 4.

The routing controller 5 includes a data frame converter 6 that performs data frame conversion of messages relayed between the first to N-th communication controllers 2 to 4, a look-up table 7 (an example is shown in FIG. 2) that stores an identification code of an in-vehicle processing device connected to each communication bus 101, 201, 301 and a communication protocol type of each communication bus 101, 201, 301, and a communication protocol switching unit 8 for switching communication protocol settings (baud rate, transmission buffer, reception buffer) of the second to N-th communication controllers 3, 4.

In FIG. 1, when the in-vehicle processing device 102 of the first network 100 transmits a message 401 (CAN data frame) to the in-vehicle processing device 202 (ECU2) of the second network, the first communication controller 2 of the in-vehicle communication device 1 receives the message 401.

Since a communication protocol (CAN) of the first communication bus 101, which is a transmission source of the message 401 received by the first communication controller 2, and a communication protocol (CAN-FD) of the second communication bus 201, which is a transfer destination, do not match, the data frame converter 6 performs frame conversion on the message 401 of the CAN data frame to generate a message 402 of the CAN-FD data frame.

The second communication controller 3 transmits the message 402 from the second communication bus 3.

The in-vehicle processing device 202 receives the message 402 via its own communication controller 203, and operates according to the content thereof.

In this way, the in-vehicle communication device 1 performs data frame conversion between a plurality of communication buses having different communication protocols, so that communication can be established between the in-vehicle processing devices connected to the different communication protocols.

On the other hand, when the in-vehicle processing device 102 (ECU1) transmits the message 401 of the CAN data frame to the in-vehicle processing device 302 (ECU-N) of the N-th network 300, since a communication protocol (CAN) of the first communication bus 101, which is a transmission source of the message 401, and a communication protocol (CAN) of the N-th communication bus 301, which is a transfer destination, match, the message 401 (CAN data frame) is transmitted from the N-th communication controller 4 to the N-th communication bus 301 without frame conversion and received by the communication controller 303 of the in-vehicle processing device 302 (ECU-N).

Figure 3:
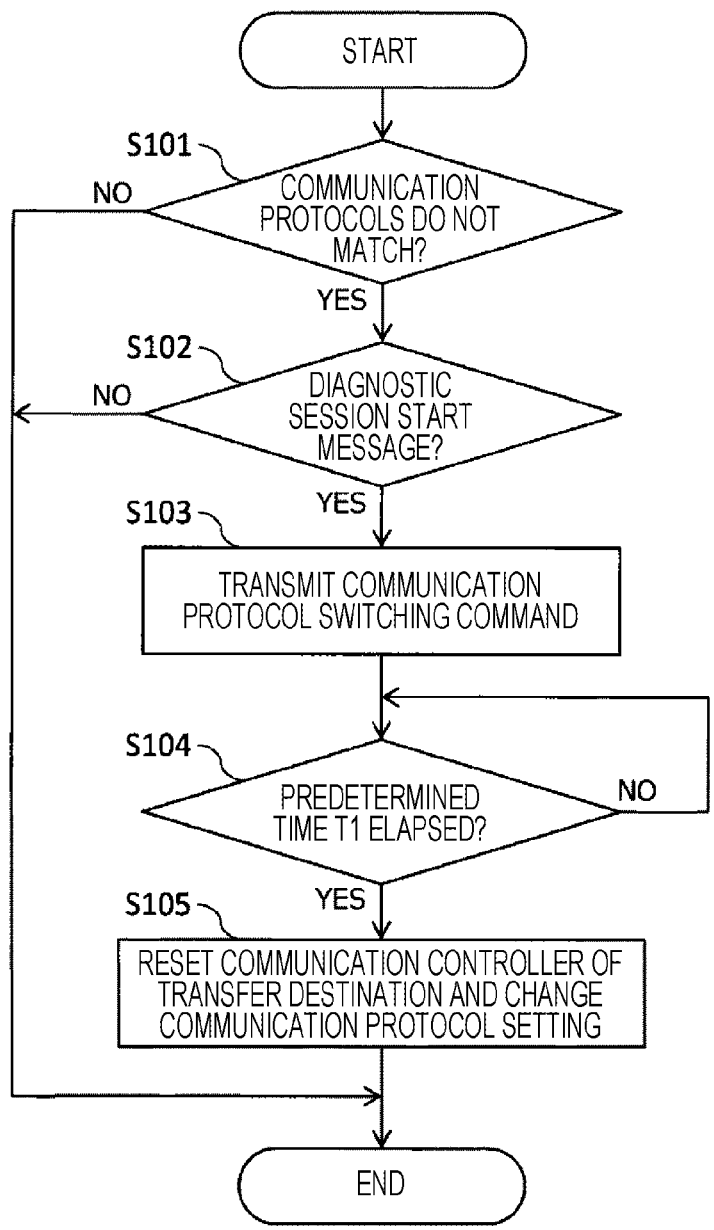
FIG. 3 is a flowchart showing a communication protocol switching process by the in-vehicle communication device shown in FIG. 1.

FIG. 3 is a flowchart showing a communication protocol switching process by the in-vehicle communication device shown in FIG. 1. Hereinafter, the in-vehicle processing device 102 (ECU1) will be described as a diagnosing device, and the in-vehicle processing device 202 (ECU2) will be described as a diagnosed device.

First, in step S101, it is determined whether or not the communication protocol of the communication bus, which is the transmission source of the message received by the communication controller 2, and the communication protocol of the communication bus, which is the transfer destination, do not match. If it is determined that the communication protocols do not match (YES), the process proceeds to step S102. On the other hand, if it is determined that the communication protocols match (NO), the communication protocol switching process is terminated. In this case, the received message is transferred to the communication bus of the transfer destination without frame conversion.

In step S102, it is determined whether or not the received message is a diagnostic session start message. Here, the diagnostic session start message is a message in which the diagnosing device 102 notifies the diagnosed device 202 of the start of the diagnostic session. If it is determined in step S102 that it is the diagnostic session start message (YES), the process proceeds to step S103. On the other hand, if it is determined that it is not the diagnostic session start message (NO), the communication protocol switching process is terminated. In this case, the received message is converted in a data frame and transmitted to the communication bus of the transfer destination.

In step S103, the communication protocol switching command is transmitted to the diagnosed device 202 (ECU2), and the process proceeds to step S104.

In step S104, it is determined whether or not the predetermined time T1 has elapsed. If it is determined that the predetermined time T1 has not elapsed (NO), the process returns to step S104, and if it is determined that the predetermined time T1 has elapsed (YES), the process proceeds to step S105. Here, the predetermined time T1 is a grace time until the communication protocol of the second communication bus 201 is switched from CAN-FD to CAN, and it is possible to perform processing such as terminating communication by CAN-FD data frame with the other in-vehicle processing device 204 (ECU3) connected to the second communication bus 201 during this period. If it is not necessary to provide such a grace period, the predetermined time T1 may be set to zero.

In step S105, the second communication controller 3 corresponding to the second communication bus 201 to which the diagnosed device 202 is connected is reset, the communication protocol setting is changed from CAN-FD to CAN, and the communication protocol switching process is terminated.

Figure 4:
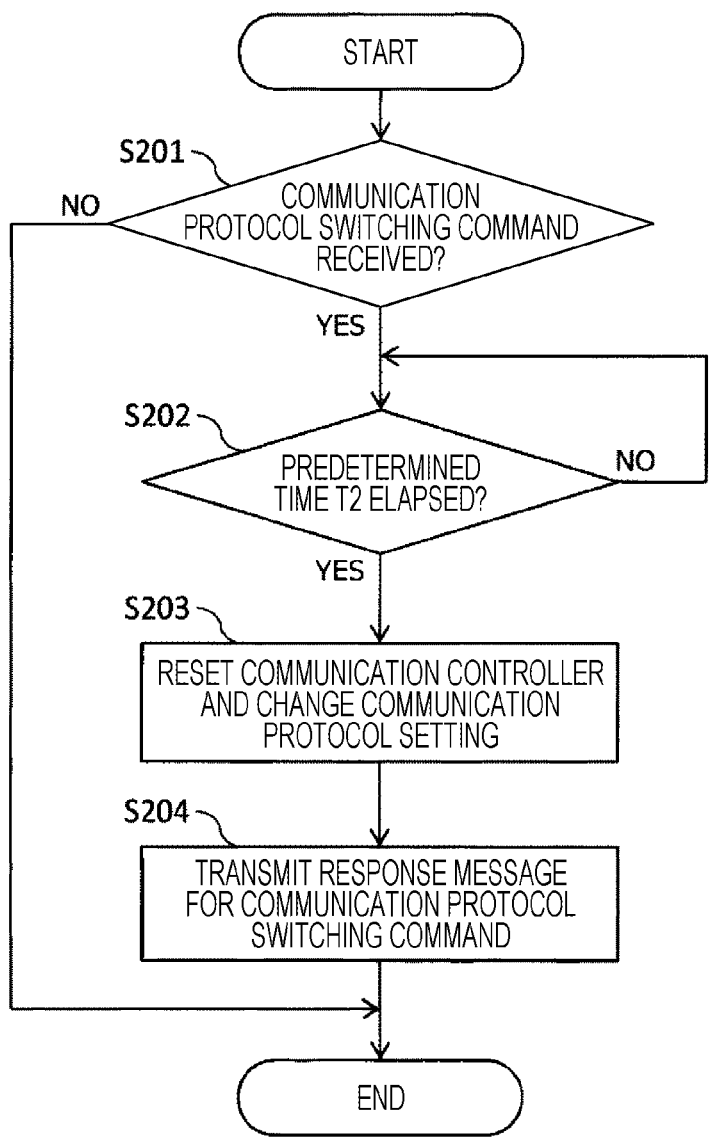
FIG. 4 is a flowchart showing a communication protocol switching process by the in-vehicle processing device shown in FIG. 1.

FIG. 4 is a flowchart showing the communication protocol switching process by the in-vehicle processing device 202 (ECU2).

First, in step S201, it is determined whether or not the communication controller 203 has received the communication protocol switching command. If it is determined that the communication protocol switching command has been received (YES), the process proceeds to step S202, and if it is determined that the communication protocol switching command has not been received (NO), the communication protocol switching process is terminated. In this case, the application corresponding to the CAN-FD data frame continues to operate in the in-vehicle processing device (ECU2).

In step S202, it is determined whether or not a predetermined time T2 has elapsed since the communication protocol switching command was received. If it is determined that the predetermined time T2 has not elapsed (NO), the process returns to step S202, and if it is determined that the predetermined time T2 has elapsed (YES), the process proceeds to step S203. Here, the predetermined time T2 is the time for waiting for the completion of the communication protocol switching of the second communication controller 3, and it is desirable to set the predetermined time T2 to be longer than the predetermined time T1 (shown in FIG. 3).

In step S203, the communication controller 203 is reset, the communication protocol setting is switched from CAN-FD to CAN, and the process proceeds to step S204.

In step S204, a response message (CAN data frame) for the communication protocol switching command is transmitted to the second network 22, and the communication protocol switching process is terminated. The response message (CAN data frame) is received by the diagnosing device 102 (ECU1) without frame conversion. After that, when the diagnostic application corresponding to the CAN data frame operates in the diagnosed device 202 (ECU2), the message of the CAN data frame can be exchanged between the diagnosing device 102 (ECU1) and the diagnosed device 202 (ECU2).

Figure 5:
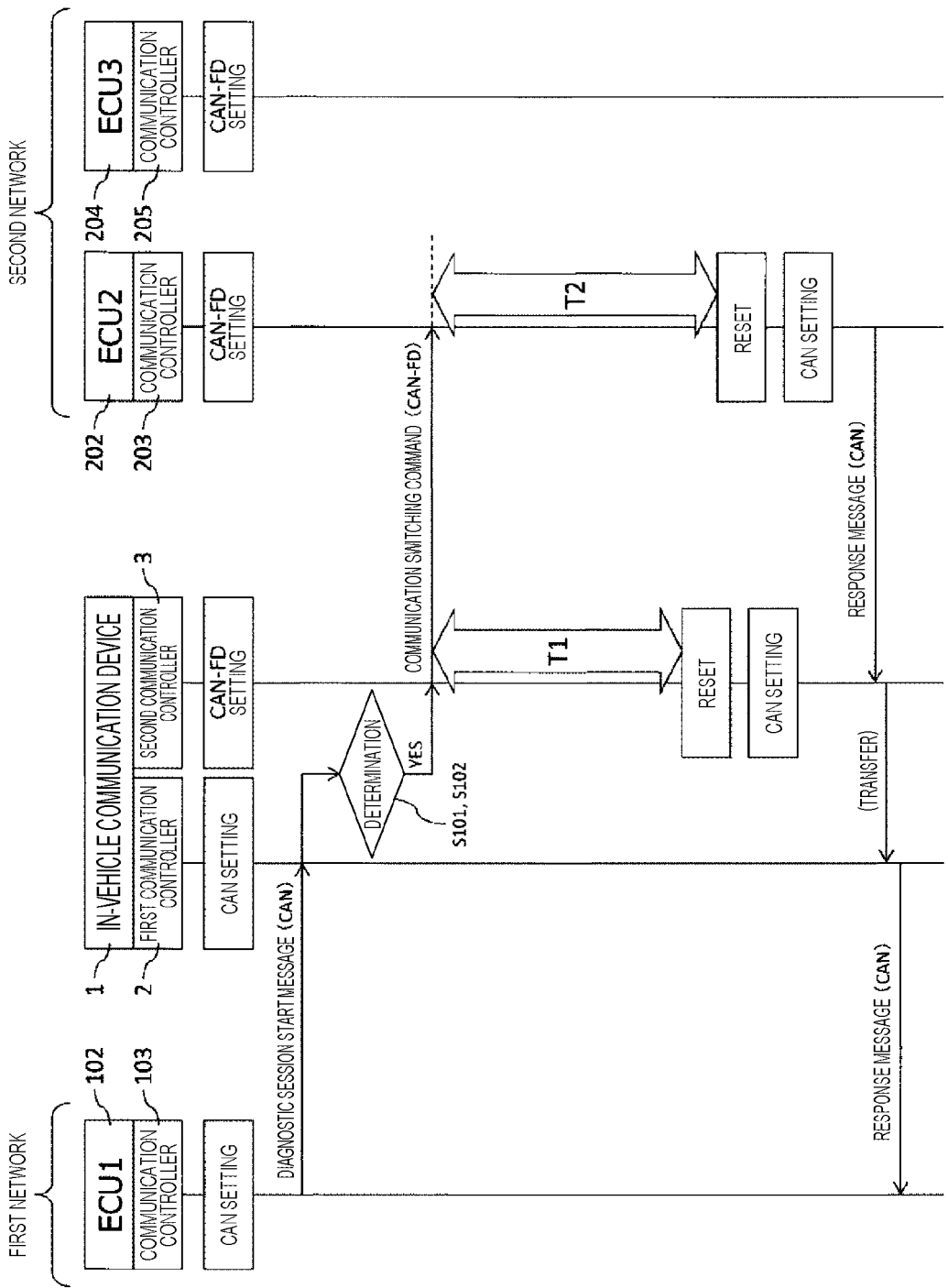
FIG. 5 is a diagram showing a communication sequence when a communication protocol of an in-vehicle system according to the present invention is switched.
Figure 6:
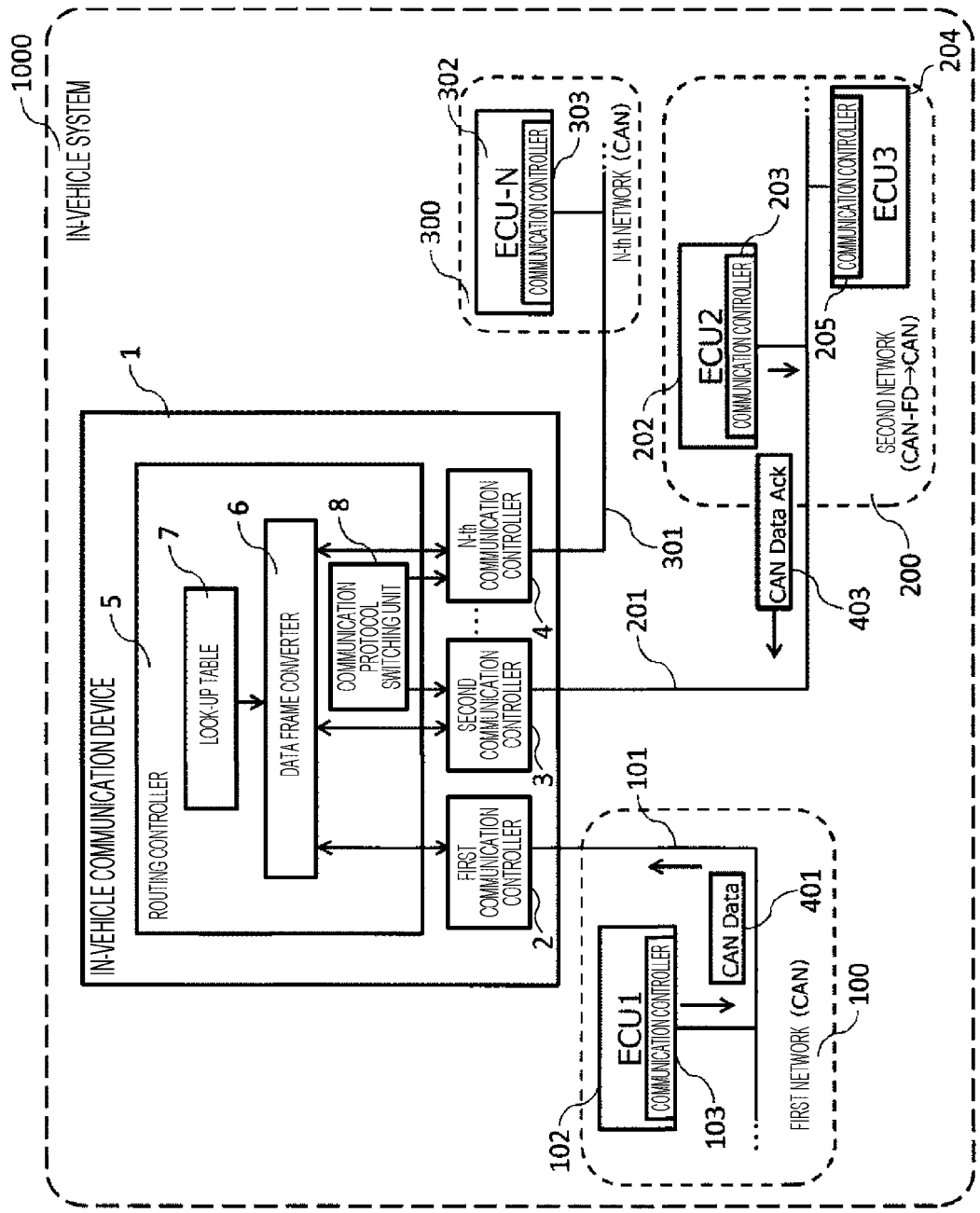
FIG. 6 is a diagram showing a communication state when the communication protocol of the in-vehicle system according to the present invention is switched.

FIG. 5 shows the communication sequence when the communication protocol of the in-vehicle system 1000 is switched, and FIG. 6 shows the communication state when the communication protocol of the in-vehicle system 1000 is switched.

In FIG. 5 or FIG. 6, the diagnosing device 102 (ECU1) transmits a diagnostic session start message to the diagnosed device 202 (ECU2).

The in-vehicle communication device 1 refers to the look-up table 7 and determines that the transfer destination of the diagnostic session start message received by the first communication controller 2 is the second communication bus 201.

The second communication controller 3 of the in-vehicle communication device 1 transmits a communication protocol switching command (CAN-FD data frame) to the second communication bus 201 to which the diagnosed device 202 (ECU2) is connected.

The diagnosed device 202 (ECU2) resets its own communication controller 203 after a predetermined time T2 has elapsed after receiving the communication protocol switching command, and switches the communication protocol setting from CAN-FD to CAN.

The diagnosed device 202 (ECU2) transmits a response message (CAN data frame) for the communication protocol switching command.

The in-vehicle communication device 1 transmits the response message (CAN data frame) received by the second communication controller 3 from the first communication controller 2 to the first communication bus 101.

After receiving the response message from the diagnosed device 202 (ECU2), the diagnosing device 102 (ECU1) communicates with the CAN data frame-compatible diagnostic application running on the diagnosed device 202 (ECU2) to diagnose the diagnosed device 202 (ECU2).

Although not shown, when the diagnosing device 102 (ECU1) finishes the diagnosis of the diagnosed device 202 (ECU2) and transmits a diagnostic session end message to the diagnosed device 202 (ECU2), the second communication controller 3 of the in-vehicle communication device 1 and the communication controller 203 of the diagnosed device 202 (ECU2) return the communication protocol setting from CAN to CAN-FD.

The case where the in-vehicle processing device 202 (ECU2) is diagnosed by the diagnosing device 102 has been described above, but the same applies to the case where the repro of the in-vehicle processing device 202 (ECU2) is performed by the diagnosing device 102. In that case, it is possible to run the CAN data frame-compatible repro application in the in-vehicle processing device 202 (ECU2).

In the present embodiment, in the in-vehicle communication device 1 which is connected to the first communication bus and the second communication bus and relays data between the first communication bus and the second communication bus, the in-vehicle communication device 1 includes the first communication controller 2 connected to the first communication bus 101 and the second communication controller 3 connected to the second communication bus 201, and when the first communication controller 2 receives a specific message (diagnostic session start message) from the first in-vehicle processing device 102 connected to the first communication bus 101 in a state where the communication protocol of the first communication bus 101 and the communication protocol of the second communication bus 201 are different, the in-vehicle communication device 1 transmits a communication protocol switching command from the second communication controller 3 to the second in-vehicle processing device 202 connected to the second communication bus 201 to switch the communication protocol setting (CAN-FD) of the second communication controller 3 to the same communication protocol setting (CAN) as that of the first communication bus 101.

According to the present embodiment configured as described above, by switching the communication protocol (CAN-FD) of the second communication bus 201 to the same communication protocol (CAN) as that of the first communication bus 101, it is possible to operate a diagnostic application and a repro application corresponding to the communication protocol (CAN) of the first communication bus 101 in the second in-vehicle processing device 202. This eliminates the need to newly create a diagnostic application and a repro application corresponding to the communication protocol (CAN-FD) of the second communication bus 201. Therefore, in an in-vehicle system in which different communication protocols coexist, it is possible to implement the diagnostic function and repro function of the in-vehicle processing device with low man-hours.

Further, when the communication protocol of the second communication bus 201 is switched, only the second communication controller 3 of the in-vehicle communication device 1 and the communication controller 203 of the second in-vehicle processing device 202 need to be reset, so that the communication protocol of the second communication bus 201 can be switched in a short time.

Although the embodiments of the present invention have been described in detail above, the present invention is not limited to the above-described embodiments, and includes various modifications. For example, the above-described embodiments have been described in detail in order to explain the present invention in an easy-to-understand manner, and are not necessarily limited to those having all the described configurations.

REFERENCE SIGNS LIST

1 in-vehicle communication device
2 first communication controller
3 second communication controller
4 N-th communication controller
5 routing controller
6 data frame converter
7 look-up table
8 communication protocol switching unit
100 first network
101 first communication bus
102 in-vehicle processing device (first in-vehicle processing device)
103 communication controller
200 second network
201 second communication bus
202 in-vehicle processing device (second in-vehicle processing device)
203 communication controller
204 in-vehicle processing device
205 communication controller
300 N-th network
301 N-th communication bus
302 in-vehicle processing device
303 communication controller
401 to 403 message
1000 in-vehicle system.

The invention claimed is:

1. An in-vehicle communication device that is connected to a first communication bus and a second communication bus and relays data between the first communication bus and the second communication bus, the in-vehicle communication device comprising:
    a first communication controller connected to the first communication bus; and
    a second communication controller connected to the second communication bus,
    wherein when the first communication controller has received a specific message from a first in-vehicle processing device connected to the first communication bus in a state where a communication protocol of the first communication bus and a communication protocol of the second communication bus are different, the in-vehicle communication device is configured to transmit a communication protocol switching command from the second communication controller to a second in-vehicle processing device connected to the second communication bus to cause a communication protocol switch to switch a communication protocol setting of the second communication controller to a same communication protocol as that of the first communication bus without switching the communication protocol of the first communication controller, wherein the second in-vehicle processing device is configured to reset the communication protocol setting of the second communication controller to an original protocol setting when a predetermined time has elapsed, and
    wherein a communication protocol of the first communication bus is CAN, and a communication protocol of the second communication bus is CAN-FD.

2. An in-vehicle system comprising:
the in-vehicle communication device according to claim 1;
the first communication bus;
the second communication bus;
the first in-vehicle processing device; and
the second in-vehicle processing device,
wherein the second in-vehicle processing device is configured to, after receiving the communication protocol switching command, switch a communication protocol setting of a communication controller of the second in-vehicle processing device to the same communication protocol setting as that of the first communication bus.

* * * * *